United States Patent [19]

Rogers

[11] Patent Number: 4,878,215
[45] Date of Patent: Oct. 31, 1989

[54] SIGNAL SWITCHING SYSTEM

[75] Inventor: William P. Rogers, Collingswood, N.J.

[73] Assignee: Telenex Corporation, Mount Laurel, N.J.

[21] Appl. No.: 28,604

[22] Filed: Mar. 20, 1987

[51] Int. Cl.$^4$ .......................... H04Q 11/04; H04J 3/12
[52] U.S. Cl. .................................. 370/58.1; 370/110.1
[58] Field of Search ....................... 370/110.1, 58, 112, 370/85, 53; 340/826, 825.79, 825.8; 379/248

[56] References Cited

U.S. PATENT DOCUMENTS

| | | | |
|---|---|---|---|
| 3,637,941 | 1/1972 | Rekiere | 370/58 |
| 4,380,064 | 4/1983 | Ishikawa et al. | 370/63 |
| 4,635,250 | 1/1981 | Georgios | 370/58 |
| 4,661,976 | 4/1987 | Takahashi et al. | 370/58 |
| 4,671,357 | 11/1986 | Naiman et al. | 370/58 |

Primary Examiner—Joseph A. Orsino
Assistant Examiner—Frank M. Scutch, III
Attorney, Agent, or Firm—Albert L. Free

[57] ABSTRACT

A system for switching signals travelling between a first set of multicontact ports and a second set of multicontact ports, in which the signals at the contacts of each of the first ports are sampled by a parallel-to-serial multiplexer to form a corresponding single serial multiplexed signal. Each such serial multiplexed signal is applied to a matrix switch of the type having a switching device at each cross-point, and each of the output signals from the matrix switch is supplied to a serial-to-parallel demultiplexer. Each such demultiplexer supplies its reconstructed separate parallel signals to its associated port in the second set of ports. By controlling the conduction status of the switching devices in the matrix, the desired connection of each of the first set of ports to the desired one of the second set of ports is accomplished, with many fewer switching devices than would otherwise be required.

3 Claims, 7 Drawing Sheets

SIGNAL SWITCHING SYSTEM

BACKGROUND OF THE INVENTION

There are many important applications in the electronics art wherein it is highly desirable, or necessary, controlledly to connect one or more multiple contact source ports to one or more signal utilization ports in any desired combination. In some cases it may be desirable to control the connection of a single source port to any of a plurality of signal utilization ports or to connect any of a plurality of source ports to one signal utilization port, but in general there may be a plurality of both source ports and signal utilization ports to be controlledly interconnected.

The problem with providing such controlled switching becomes increasingly more difficult as the number of source ports and/or signal utilization ports is increased, and the problem becomes particularly severe when the number of signals in each port is large. For example, the standard RS-232 port provides 24 signals (plus ground), one of which typically carries a serial data signal and the others of which typically carry auxiliary information, for example timing and control signals for effecting the desired communication of the serial data signal. While in some cases all 24 of the signals need not be utilized, even when less than all of the signals are used the complications of the switching operation can become unduly burdensome. Where the switching system is to be of most general utility the problem is most severe, in that it should be able to provide controlled switching of all 24 of the port signals since, in a given situation, any one of the signals or all of them may be utilized. If, as is not unusual, there are 128 source ports and 128 utilization or destination ports, it would be necessary to provide a matrix having 393,216 crosspoint switching elements to effect the desired switching by conventional means.

Accordingly, other methods of accomplishing such switching have been proposed and employed, including the time-division multiplexed-bus switch in which the source and the destination ports are all connected to a common bus containing a line for each corresponding contact of the ports, so that by turning on any selected source port and any selected destination port at the same instant, the desired communication can be accomplished momentarily for any selected pair of such devices. Since communication is desired between all source devices and destination devices, each of the destination devices is switched on momentarily and repetitively when each of the source device is switched on, in time-multiplex fashion. In order for this to be effective, especially with signals embodying high data rates, the switching must be accomplished at extremely high rates. For example, if a 9600 baud signal is to be transferred with no more than 12.5% distortion, then it must be sampled at least 76,800 times per second. If 256 such sets of signals are to be switched over the same bus, then the aggregate sampling rate of the bus must be at least 19,660,800 samples per second. More signals, higher speeds, and lower distortion all require even higher sampling rates on the high speed bus so that the overall performance of this type of switching is limited by the bandwidth that is available on the high speed bus.

The present invention provides a signal switching system which is not subject to the bandwidth limitations of the above-described time-multiplexed common bus system, and which does not require the large number of switching elements required by the standard matrix switching also described above.

It is therefore an object of the present invention to provide a new and useful signal switching system.

Another object is to provide such system which does not require the large number of switching elements or the high bandwidth required of previous systems for accomplishing comparable switching.

SUMMARY OF THE INVENTION

These and other objects of the invention are achieved by the provision of a signal switching system for controlled connection of any source port to any signal utilization port by converting the source signals from each source port into a single serial time-multiplexed signal prior to its application to the switching system, applying each serial time-multiplexed signal to the switching system, and then demultiplexing each signal to convert it back to its original parallel form after it leaves the switching device. This greatly decreases the number of switching devices required in the switching system; for example, where the number N of separate signals at each source port is the same as the number N of signals at each signal utilization port, the number of switching elements required is decreased by a factor N, for example by a factor of 24 if there are 24 signals or contacts in each port and the signals are unidirectional. If the signals are bidirectional (i.e. travel in both directions between the connected ports), then the number of switching elements is decreased by N/2, in this example by 12. At the same time, the system is not subject to the bandwidth restrictions of the multiplexed-bus type of switching arrangement described previously.

The multiplexing and demultiplexing required is preferably provided by means of the plug-contained multiplexers and demultiplexers described in detail in my co-pending application Ser. No. 803,894 filed Dec. 2, 1985, wherein each multiplexer or demultiplexer is contained in the casing of a plug which also mounts the contacts designed to mate with the source port or the destination port, so that the desired multiplexing and demultiplexing is accomplished by merely plugging the line into the appropriate source or destination port. An extremely effective form of this system which results from the combination of the plug-contained multiplexer-demultiplexer lines with the simple form of matrix switch described generally above is described in more detail hereinafter.

BRIEF DESCRIPTION OF FIGURES

These and other objects and features of the invention will be more readily understood from a consideration of the following detailed description, taken with the accompanying drawings, in which.

DETAILED DESCRIPTION OF SPECIFIC EMBODIMENTS

Figure 1A:
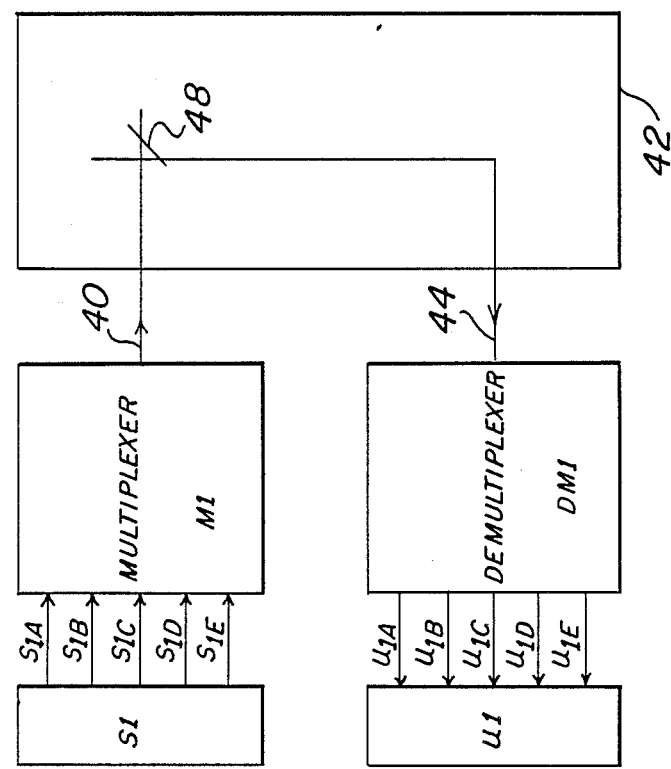
FIG. 1A is a schematic diagram showing a system according to the invention for performing the same overall function as the prior art system of FIG. 1.
Figure 1:
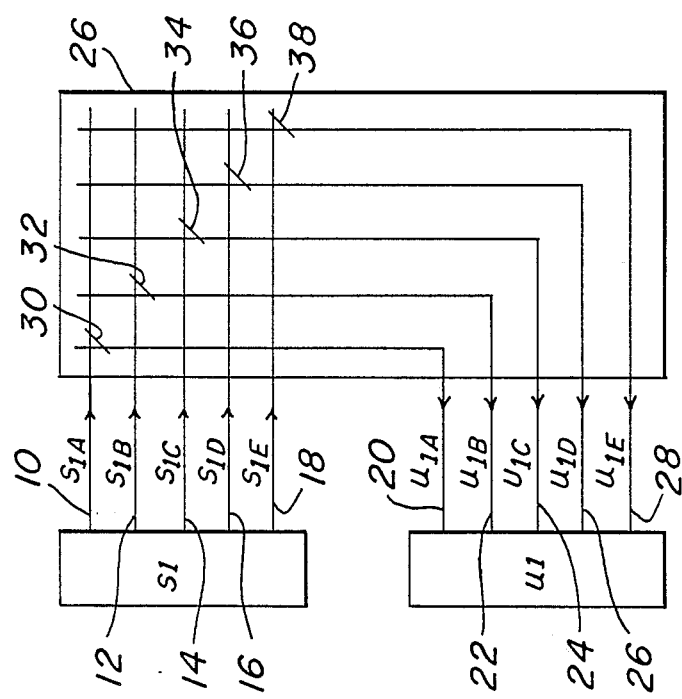
FIG. 1 is a schematic diagram showing an elementary form of matrix switching system according to the prior art.

Referring now to the conventional switching system shown in FIG. 1, a source port $S_1$ presenting five separate signals S1A, S1B, S1C, S1D and S1E on five corresponding output lines 10, 12, 14, 16 and 18, one for each of the separate output signals; a signal utilization port $U_1$ is provided with five corresponding input lines 20, 22, 24, 26 and 28. Assume that it is desired to be able to connect the output lines of S1 to, or disconnect them from, the input lines to $U_1$. To this end, the two sets of lines 10–18 and 20–28 each may be connected to a maxtrix switching system 26, which includes five controllable switching devices 30, 32, 34, 36 and 38, each disposed between one of the lines from the source $S_1$ and a particular corresponding one of the lines connected to the utilization device $U_1$. It is noted that even in this simple, rudimentary switching operation, five switching devices are required. Such arrangements are common in the prior art.

FIG. 1A shows a system employing the same signal source $S_1$ and the same signal utilization device $U_1$. In accordance with the present invention, the five signals from $S_1$ are supplied to a first multiplexer $M_1$, which samples them sequentially to form on its output line 40 a serial time-multiplexed version of the separate input signals thereto. Output line 40 is connected to the switching system 42, as is the single line 44 leading to a demultiplexer $DM_1$, the output of which feeds the utilization device $U_1$. Switching system 42 consists of a single controllable switch device 48, controllable to connect or isolate lines 40 and 44 with respect to each other.

In operation then, if it is desired to supply the five signals at $S_1$ to $U_1$, the switching device 48 is closed, the serial-time multiplexed signals on line 40 are thereby supplied to the input line 44 to demultiplexer $DM_1$, and the latter device supplies to $U_1$ the five reconstructed signals corresponding to those from source $S_1$. The overall objective of controlling whether or not the signals from $S_1$ are supplied to $U_1$ is accomplished with a switching system requiring only a single switching device, rather than the five required in the prior art system, for a reduction of 5:1 in switching devices.

Figures 2, 2A:
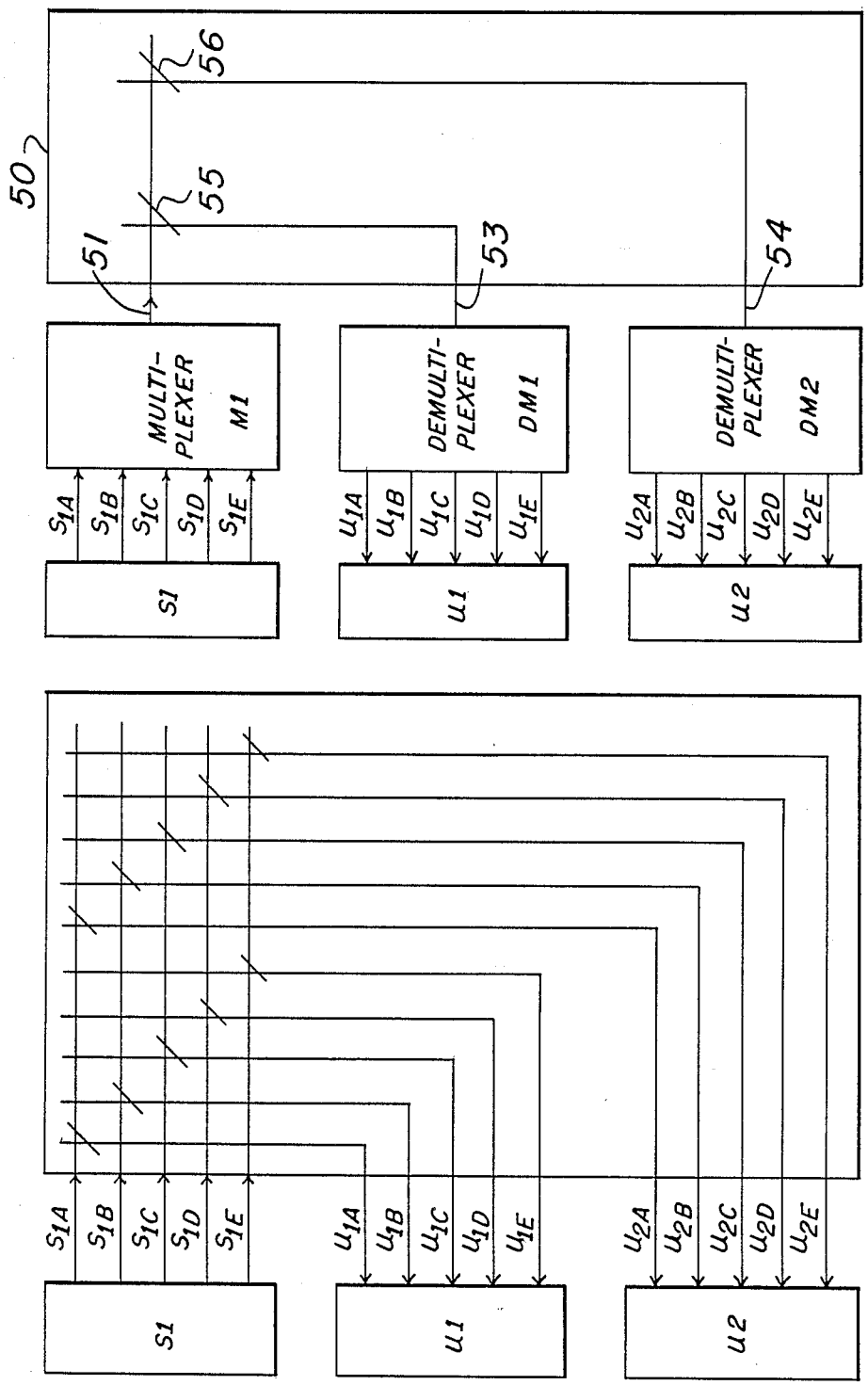
FIG. 2 is a schematic diagram of another form of prior art switching system.
FIG. 2A is a schematic diagram of a switching system according to the invention, for performing the functions of the system of FIG. 2.

FIG. 2 illustrates the corresponding case in which five signals on five output lines of $S_1$ may be switched to utilization port $U_1$ or to utilization port $U_2$, as desired. The switching system shown for accomplishing this is a simple conventional matrix switching system, as provided by the prior art, in which each of the five output lines from $S_1$ is connectable to either a corresponding line leading to $U_1$ or to a corresponding line leading to $U_2$, by actuating the appropriate ones of the switching devices to their closed or open conditions in appropriate well-known manner.

FIG. 2a shows an arrangement according to the present invention corresponding to the basic type of system shown in FIG. 2. Here the same source $S_1$ supplies its five output signals to a parallel-to series multiplexer $M_1$ and the output of the multiplexer is fed to switching system 50 over line 51. The utilization devices $U_1$ and $U_2$ are connected separately to the switching system 50 by way of respective series to parallel demultiplexers $DM_1$ and $DM_2$ and lines 53 and 54. Only two switching devices 55 and 56 are required in the switching system to provide the desired switch control action, compared with the ten required in the prior art arrangement of FIG. 2, for a 5:1 reduction in the number of switching devices.

Figure 3A:
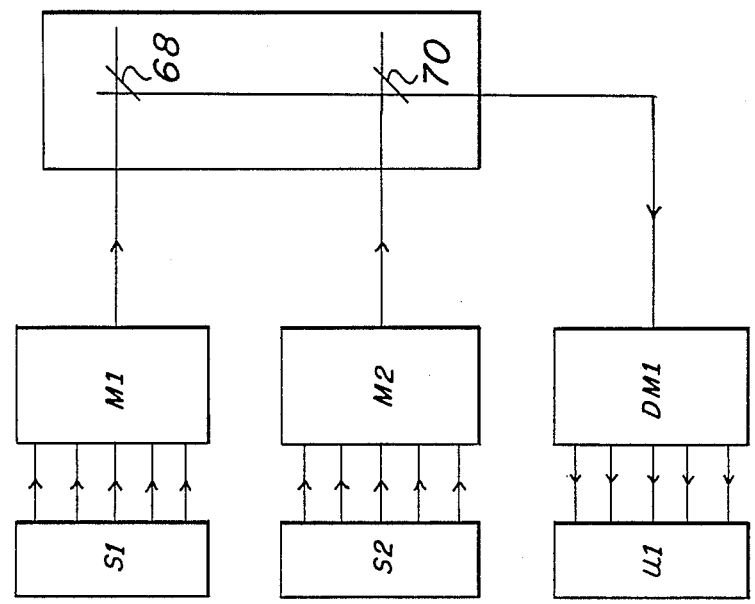
FIG. 3A is a schematic diagram according to the invention for performing the functions of the system of FIG. 3.
Figure 3:
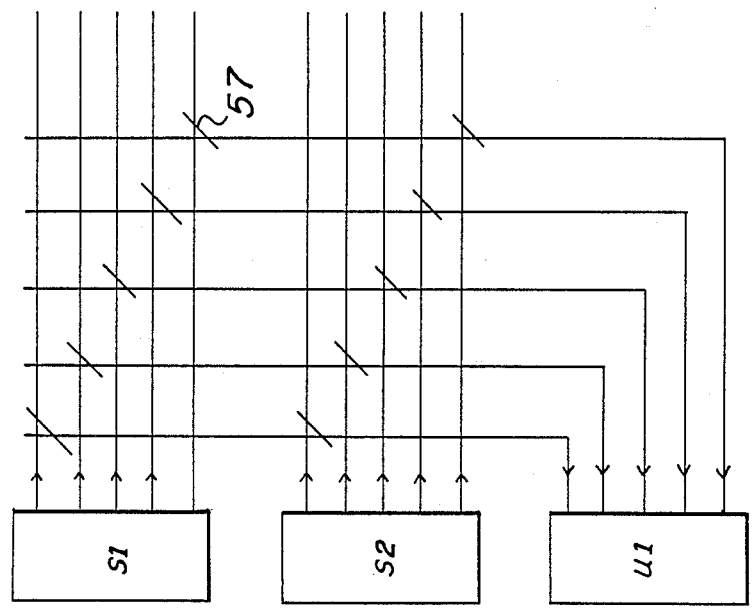
FIG. 3 is a schematic diagram of another switching system according to the prior art.

FIGS. 3 and 3A illustrate, respectively, a system according to the prior art and a system according to the present invention by means of which either the source port $S_1$ presenting five signals or the source port $S_2$ presenting five different signals may be connected to the single signal utilization device $U_1$. Again, the conventional arrangement of FIG. 3 utilizes a simple switching matrix system using ten switching devices such as 57.

The system of FIG. 3A utilizes two different parallel to serial multiplexers $M_1$ and $M_2$ connected to the respective sources $S_1$ and $S_2$, and a single serial to parallel demultiplexer $DM_1$ supplying the signal utilization device $U_1$. The switching system comprises a simple matrix utilizing only two switching devices 68 and 70, which connect either the output of $M_1$ or of $M_2$ to the input of $DM_1$. The 5:1 saving in switching complexity will be apparent here also.

Figure 4A:
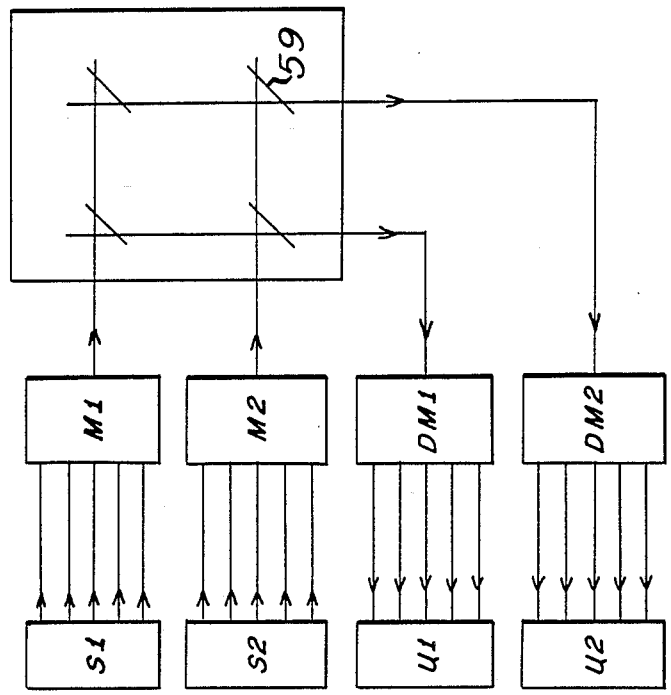
FIG. 4A is a schematic diagram of a system according to the invention for performing the function of the system of FIG. 4.
Figure 4:
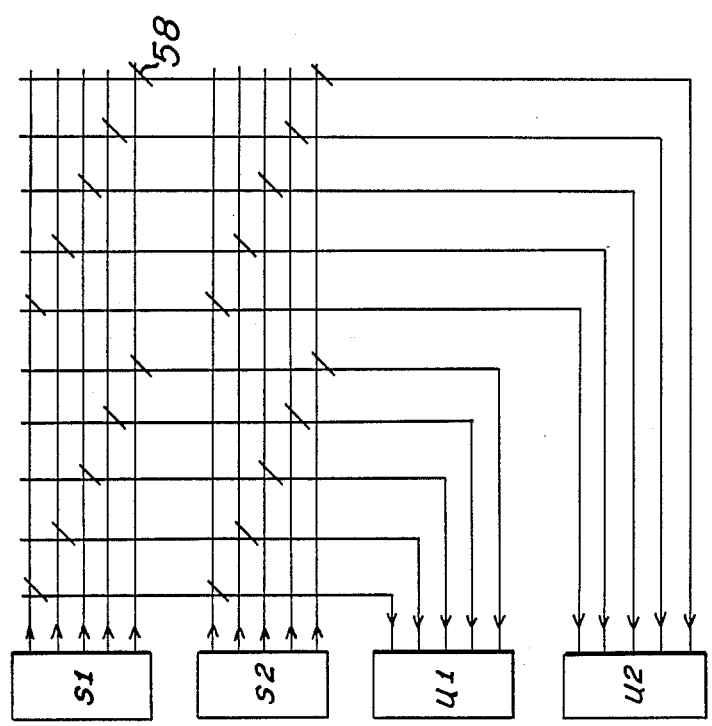
FIG. 4 is a schematic diagram of another switching system according to the prior art.

FIGS. 4 and 4A illustrate systems according to the prior art and according to the invention, respectively, which approach a little more closely those which are of more commercial interest. In this case, there are a plurality of source ports ($S_1$, $S_2$) and of utilization devices ($U_1$, $U_2$). In the prior art arrangement of FIG. 4, the switching system is again a simple matrix utilizing twenty switching devices such as 58, while in the arrangement of FIG. 4A according to the invention, the arrangement utilizes two parallel to serial multiplexers $M_1$ and $M_2$ and two serial to parallel demultiplexers $DM_1$ and $DM_2$; the switching system itself is a simple matrix utilizing only four switching devices such as 59, which enable either the output of $M_1$ or the output of $M_2$ to be supplied to the input of either $DM_1$ or $DM_2$. The reduction in number of switching devices is again 5 to 1.

It will be understood that the specific arrangement illustrated in FIGS. 4 and 4A is still of far less complexity than is often or generally involved in a commercial situation. As mentioned above, a commercial system using 128 RS-232 source ports and 128 RS-232 utilization ports, each having 24 lines or contacts, would conventionally require 393,216 cross-point switching elements, while using the present invention only 12,288 or 24 times less are required.

Figure 5:
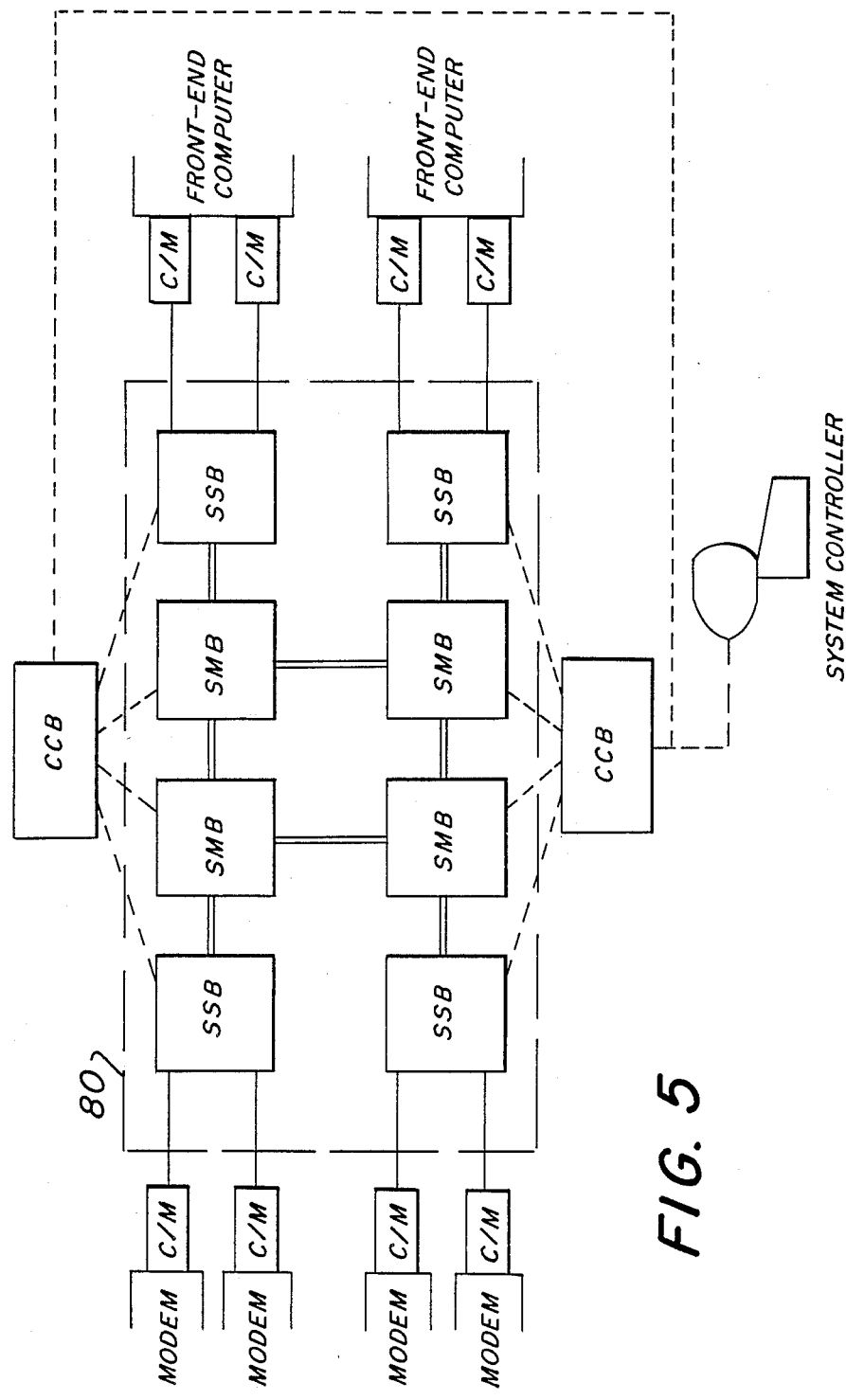
FIG. 5 is a schematic diagram of a switching system according to the invention as applied to the switching of connections between a plurality of computer front ends and a plurality of modems.

FIG. 5 shows in more detail a type of commercial system in which the invention has more practical application. FIG. 5 shows computer front end A and front end computer B, and it is assumed that there are a large number of similar computer front ends to be accommodated. Each computer front end is provided with two ports, which may be of the RS-232 type. Also shown are modems A, B, C and D each connected to respective telephone lines (not shown) for external communication. The system shown permits any one of the four modems (or any of a large number of additional modems, not shown for convenience) to be connected to any one of the front-end ports of computers A or B, or to any other computer front ends which may be employed.

The system of FIG. 5 as shown permits communication in either direction between modem and computer front end, that is, a signal maY travel from modem to computer or from computer to modem through a suitable channel for each direction of transmission. To permit this the system uses at each modem port and at each front-end port a cable multiplexer C/M such as is described in my copending application Ser. No. 803,894 filed Dec. 2, 1985, which provides such duplex action within a plug adapted to be plugged into an RS-232 port.

The switching system then provides the desired controlled two-way connection between each computer front-end port and the port of any selected one of the modes. It comprises in this example the standard switching boards (SSB's) 82, 84, 86 and 88 which provide conversion in either direction between the balanced-pair lines preferably used in the two-wire cables connecting the switching system to the modems and cable multiplexers, and the single-wire and ground system used within the switching system. The SSB's may also provide some of the switching action. The standard matrix boards (SMB's) 90, 91, 92 and 93 are interconnected in any suitable conventional manner to provide the remaining necessary switching action. Preferable one switch is used for communication in one direction and another for communication in the other direction.

The switch elements are preferably on chips, and controlled by the chassis controller boards (CCB's) 94 and 95, which in turn may be controlled by a system controller 98, which may be based on an IBM PC-XT.

Figure 6:
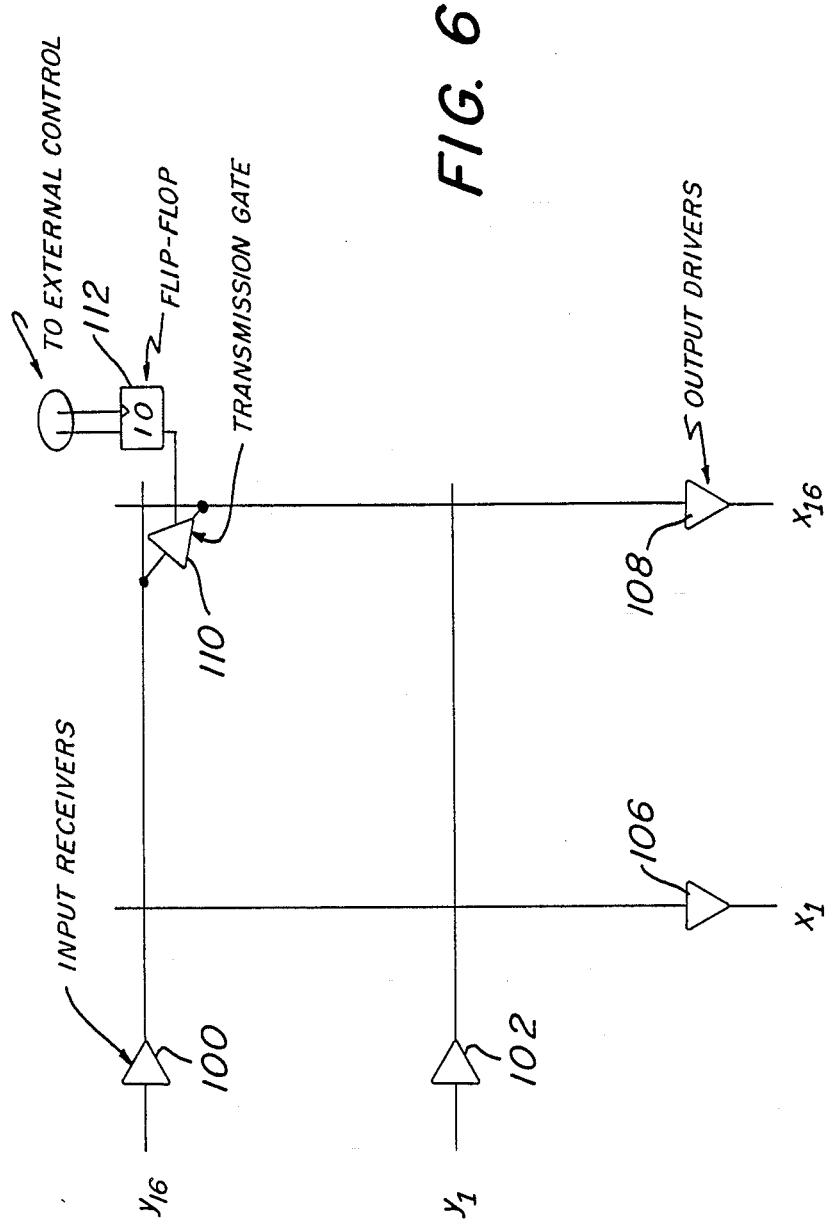
FIG. 6 is a schematic diagram illustrating a preferred circuit arrangement for controlling each of the switching devices in the matrix system of the invention.

FIG. 6 shows the basic arrangement of a typical switching chip in the matrix, assuming a grid of 16 input lines Y1 to Y16 and 16 output lines X1 to X16. Each input line is provided with an input receiver such as 100, 102 and each output line is provided with an output driver such as 106, 108. The switching device is in each case a transmission gate such as 110, controlled by a flip-flop such as 162, from the external controller. Only one such arrangement is shown, but it will be understood that one such arrangement of flip-flop and transmission gate is used for each cross-point switching device.

While the invention has been described with particular reference to specific embodiments in the interest of complete definiteness, it will be understood that it may be embodied in a variety of forms diverse from those specifically shown and described.

What is claimed is:

1. A signal-switching system, comprising:
   a plurality of groups of input signal lines each carrying on one of its lines a data signal and on a plurality of its other lines signals relating to said data signal
   a plurality of time multiplexers each connected to a corresponding different one of said groups of input signal lines and each producing a stream of time-multiplexer serial-bit signals corresponding to the signals on said corresponding groups of input signal lines;
   a plurality of serial-to-parallel time demultiplexing means each responsive to any of said streams of time-multiplexed serial signals supplied thereto to produce a corresponding group of separate reproduced parallel signals substantially the same as those carried by that one of said groups of input lines connected thereto;
   cross-point signal switching means connected between all of said multiplexers and all of said demultiplexers and controllable to supply any one of said streams of serial-bit signals directly, and without storage, substantially instantaneously from the multiplexer producing it to any selected one of said plurality of time-demultiplexing means without changing the order of bits in said streams; and
   means for supplying said reproduced parallel signals from each of said time-demultiplexing means to a corresponding one of said groups of signal utilization lines.

2. The system of claim 1, wherein said cross-point signal switching means comprises a matrix switch having a plurality of input terminals supplied with respective different ones of said time-multiplexed serial-bit signals from said plurality of multiplexers, a plurality of output terminals connected to respective different ones of said plurality of demultiplexers, and electrically controllable switching elements for connecting any selected one of said input terminals to any selected one of said output terminals of said switching means.

3. The system of claim 1, wherein each of said groups of input signal lines comprises an RS-232 port, and the signals on the contacts thereof are in RS-232 format.

* * * * *